(12) United States Patent
Busch et al.

(10) Patent No.: US 12,480,745 B2
(45) Date of Patent: Nov. 25, 2025

(54) BALLISTIC PROTECTIVE HELMET (71) Applicant: Busch PROtective Germany GmbH & Co. KG, Gütersloh (DE)

(72) Inventors: Edwin Busch, Gütersloh (DE); Sebastian Eichler, Rheda-Wiedenbrück (DE); Karina Gevers, Gütersloh (DE)

(73) Assignee: Busch PROtective Germany GmbH & Co. KG, Gütersloth (DE)

( * ) Notice: Subject to any disclaimer, the term of this patent is extended or adjusted under 35 U.S.C. 154(b) by 626 days.

(21) Appl. No.: 16/732,188

(22) Filed: Dec. 31, 2019

(65) Prior Publication Data

US 2020/0217621 A1 Jul. 9, 2020

(30) Foreign Application Priority Data

Jan. 8, 2019 (DE) .................... 10 2019 100 278.8

(51) Int. Cl.
| | |
|---|---|
| *F41H 1/08* | (2006.01) |
| *A42B 3/06* | (2006.01) |
| *A42B 3/22* | (2006.01) |
| *F16B 23/00* | (2006.01) |
| *F16B 35/00* | (2006.01) |
| *F16B 39/22* | (2006.01) |

(52) U.S. Cl.
CPC .............. *F41H 1/08* (2013.01); *A42B 3/063* (2013.01); *A42B 3/221* (2013.01); *F16B 23/0084* (2013.01); *F16B 35/005* (2013.01); *F16B 39/225* (2013.01)

(58) Field of Classification Search
CPC .......... F41H 1/08; F41H 1/04; F16B 23/0084; F16B 35/005; F16B 39/225; F16B 37/125; A42B 3/063; A42B 3/221; A42B 3/04; A42B 3/30; A42B 3/147; A42B 3/00; A42B 3/06; A42B 3/28; A42B 3/20; A42B 3/16; A42B 3/08; A42B 3/12; A42B 3/18; A42B 1/24
USPC .................................................. 2/422
See application file for complete search history.

(56) References Cited

U.S. PATENT DOCUMENTS

| | | | | |
|---|---|---|---|---|
| 3,353,188 A | * | 11/1967 | Crincic | ................... A42B 3/322 |
| | | | | 2/171.1 |
| 4,122,753 A | * | 10/1978 | Kuhlmann | ............ F16B 13/045 |
| | | | | 411/2 |
| 5,394,566 A | * | 3/1995 | Hong | ...................... A42B 3/283 |
| | | | | 2/424 |

(Continued)

FOREIGN PATENT DOCUMENTS

| | | |
|---|---|---|
| DE | 19961371 A1 | 7/2001 |
| DE | 102013215291 A1 * | 2/2015 ........... B25B 27/143 |

(Continued)

*Primary Examiner* — Uyen T Nguyen
(74) *Attorney, Agent, or Firm* — Rankin, Hill & Clark LLP (57) ABSTRACT

(in connection with FIG. 1)
The invention relates to a ballistic protective helmet (10) comprising a shell (21) comprising a shell material that is produced from a number of textile layers (11, 12) connected in a connection matrix.
The shell (21) of the protective helmet (10) according to the invention has a blind hole (22), wherein a threaded sleeve (23) has an outer thread (25) that penetrates into the shell material which surrounds the blind hole (22) in a peripheral direction, and wherein the threaded sleeve (23) has an inner thread (26) for connecting to a screwing means (24) having an outer thread (31).

15 Claims, 5 Drawing Sheets

(56) References Cited

U.S. PATENT DOCUMENTS

| | | | | |
|---|---|---|---|---|
| 5,713,705 A * | 2/1998 | Grunbichler | ............ | F16B 31/021 |
| | | | | 411/910 |
| 5,882,162 A * | 3/1999 | Kaneko | ............... | F16B 25/0057 |
| | | | | 411/386 |
| 6,388,813 B1 * | 5/2002 | Wilson | ................... | B32B 37/12 |
| | | | | 359/630 |
| 2002/0131843 A1 | 9/2002 | Chen-Chi et al. | | |
| 2008/0142151 A1 * | 6/2008 | Busch | ................... | B29C 70/465 |
| | | | | 156/148 |
| 2008/0240883 A1 * | 10/2008 | Walling | ................ | F16B 37/125 |
| | | | | 700/95 |
| 2009/0288242 A1 * | 11/2009 | Kato | ...................... | A42B 3/223 |
| | | | | 24/604 |
| 2010/0322738 A1 * | 12/2010 | Lau | ....................... | F16B 37/125 |
| | | | | 411/17 |
| 2012/0222199 A1 * | 9/2012 | Tatomir | .................. | A42B 3/20 |
| | | | | 2/422 |
| 2013/0031692 A1 | 2/2013 | Wratten | | |
| 2014/0115745 A1 | 5/2014 | Martinez | | |
| 2015/0245682 A1 * | 9/2015 | McGinn | ................. | A42B 3/185 |
| | | | | 2/424 |
| 2016/0088891 A1 * | 3/2016 | Walsh | .................... | A42B 3/003 |
| | | | | 2/421 |
| 2016/0123370 A1 * | 5/2016 | Färber | .................. | F16B 37/127 |
| | | | | 411/411 |
| 2016/0262483 A1 * | 9/2016 | Cheng | ...................... | A42B 3/08 |
| 2019/0098952 A1 | 4/2019 | Teetzel et al. | | |
| 2019/0104797 A1 | 4/2019 | Teetzel et al. | | |
| 2019/0107247 A1 * | 4/2019 | Teetzel | ................... | F16M 13/04 |
| 2019/0383319 A1 * | 12/2019 | Simpson | ................ | C23C 30/00 |

FOREIGN PATENT DOCUMENTS

| | | |
|---|---|---|
| DE | 102014019516 A1 | 6/2016 |
| EP | 1750921 B1 | 7/2008 |
| EP | 2949229 A2 | 12/2015 |

\* cited by examiner

BALLISTIC PROTECTIVE HELMET

The invention relates to a ballistic protective helmet comprising a shell comprising a shell material that is produced from a number of textile layers connected in a connection matrix.

A corresponding ballistic protective helmet is disclosed in EP 1 750 921 B1. In particular, a method for producing a ballistic protective armor, in particular a protective helmet, is disclosed therein. A ballistic protective helmet produced using such a method has many advantages since in particular protection from ballistic projectiles is significantly improved in comparison to other protective armor, or respectively protective helmets.

Ballistic protective helmets serve for example as military helmets, or helmets for police to protect against impact from projectiles and grenade fragments. Such protective helmets are normally produced from several textile layers of high-strength technical fabric that is hot-pressed at an elevated temperature so that a laminate arises. In this case, the textile layers can be additionally sewn so that the density and strength of the produced layered structure can be enhanced, which improves the protective effect of the armor, or respectively the protective helmet.

It is moreover known to produce protective helmets from laminated textile layers that absorb much of the energy from an impacting projectile. This is accomplished in that the projectile that penetrates through the outer layers of the laminate deforms in the process and is captured by the remaining layers on the inside of the armor to be protected since the kinetic energy is already strongly reduced after the destruction of the outer layers. In so doing, the remaining capturing layers normally partially release from the penetrated outer layers so that a bulge toward the inside of the armor arises in which the projectile remains.

EP 1 750 921 B1 now provides for this bulging effect to be reduced by providing radial seams that limit the delamination effect of the capturing layers.

Moreover, additional accessory parts, or respectively components are attached to such ballistic protective helmets. These accessory parts, or respectively components, can be a neck guard, a visual protection, an ear protection, a night vision device, a lamp, and other components. For example, a type of click rail can also be used that in particular is attached to the side of the protective helmets in order to releasably fasten accessory parts to the click rail and hence to the helmet in an easy and fast manner.

Such a click rail or the accessory parts can be adhered to the outer shell of the helmet, or be fastened by a screw connection passing through the shell of the protective helmet. The disadvantage of adhering accessory parts is that the adhesive connection can be released during use from the influences of weather. The disadvantage of the screw connection passing through the shell of the protective helmet is that elevated delamination of the textile layers occurs from a shearing effect when a ballistic projectile contacts this bolt so that the protective effect can be reduced in the event of a shot against precisely this bolt.

It is an object of the present invention to provide a ballistic protective helmet with which it is possible to releasably and fixably attach accessory parts, or respectively other components of the ballistic protective helmet, in an easy and efficient manner without impairing, or respectively only slightly impairing, the protective function of the protective helmet.

This object is solved by a ballistic protective helmet comprising a shell comprising a shell material that is produced from a number of textile layers connected in a connection matrix, wherein the shell has a blind hole, wherein a threaded sleeve is introduced into the blind hole, wherein the threaded sleeve has an outer thread that penetrates into the shell material which surrounds the blind hole in a peripheral direction, and wherein the threaded sleeve has an inner thread for connecting to a screwing means having an outer thread.

It was surprisingly found that the use of a threaded sleeve in a blind hole that serves for connecting to a screwing means having an outer thread weakens the delamination of the textile layers of the layered structure of the shell of the ballistic protective helmet much less than a bolt passing through the shell.

Preferably, the blind hole is arranged outside in the shell so that the capturing layers of the protective helmet are not weakened by the provision of the blind hole.

Preferably, the threaded sleeve is produced from a stainless steel, such as X5CrNi18-10 or a similar steel. More preferably, the screwing means is also produced from stainless steel or a machining steel such as 11SMnPb30 or a similar steel.

When the threaded sleeve is preferably glued in the blind hole, the threaded sleeve is anchored more securely in the shell and thus enables a longer life of the ballistic protective helmet.

Preferably the threaded sleeve is fixedly introduced in the shell material for the routine use of the protective helmet.

Preferably, the blind hole has a depth of 4 mm to 10 mm, in particular 5 mm to 8 mm, in particular 6 mm to 7 mm.

Preferably, the blind hole has a depth that is less than or equal to three-fourths, in particular one-half, of the thickness of the shell of the ballistic protective helmet.

More preferably, the length of the threaded sleeve is adapted to the depth of the blind hole, in particular, the length is slightly smaller than the depth. In particular, the depth is between 0.1 mm and 1 mm larger than the length of the threaded sleeve.

Preferably, the threaded sleeve is introduced flush with the top side of the ballistic protective helmet.

If the thread pitch of the outer thread of the threaded sleeve is preferably $1/7$ to $3/7$, in particular $2/7$ of the outer diameter of the threaded sleeve, a highly stable fastening of the threaded sleeve in the shell of the ballistic protective helmet is possible.

Preferably, the thread depth of the outer thread of the threaded sleeve is $3/28$ to $2/7$, in particular $1/7$ of the outer diameter of the threaded sleeve. In this case, a compromise is achieved between a stability of the threaded sleeve in the shell of the ballistic protective helmet and a minimal negative influence on the delamination of the textile layers when the threaded sleeve or a screwing means connected thereto is struck by a projectile.

The thread pitch is preferably within a range of 1 mm to 3 mm, particularly preferably 2 mm. The thread depth is preferably 0.5 mm to 2.0 mm, particularly preferably 1.0 mm.

Preferably, the wall thickness of the threaded sleeve is from 0.5 mm to 3.0 mm, in particular from 0.8 mm to 2.0 mm, in particular from 0.9 mm to 1.5 mm, in particular from 1.0 mm to 1.2 mm.

The wall thickness in this case is the core diameter of the outer thread minus the outer diameter of the inner thread. Particularly preferably, the wall thickness is 1.0 mm. This wall thickness by itself would be insufficiently secure upon being shot with a ballistic projectile. For this reason, it is preferable when it is made clear to the user that a screwing means having an outer thread must always be introduced into the threaded sleeve. In this regard, it is preferably provided that the threaded sleeve has a warming color, at least on a part that is visible in a state in which the threaded sleeve is introduced into the blind hole. This warning color that is a dearly contrasting color in comparison to the color of the shell of the ballistic protective helmet should make it clear to the user that the protective helmet cannot be used in this form. The ballistic protective helmet is only ready for use by screwing in a screwing means having an outer thread, for example to affix an accessory part or another component to the protective helmet or, if an accessory part is not to be attached, a corresponding bolt that covers the warning color after being screwed in. If the shell for example has a black color or an anthracite color, the in particular highly contrasting color can be bright orange, bright red, or bright yellow, i.e., a relatively bright and conspicuous color.

Preferably the screwing means having the outer thread is screwed into the threaded sleeve, and in particular has a head that has a head width which is two to four times as large as an outer diameter of the outer thread of the screwing means. In particular, the head width is at least three times as large as the outer diameter of the outer thread of the screwing means. In the context of the invention, the head width is defined such that it is the spacing between two opposing sides or tangents of the head. It can also be the diameter of the head, for example in the event that a knurled bolt is used. Preferably however, a hexagon bolt rounded at the edges or a hex head bolt is used.

Preferably, the thickness of the head at the thinnest point is greater than the wall thickness of the threaded sleeve. This results in further ballistic protection. Preferably, the thickness of the head at the thinnest point is between 1.1 to 2.5 times as thick as the wall thickness of the threaded sleeve. Preferably, the factor is 1.4 to 2 times. Preferably, the thickest point is at least twice as thick as the wall thickness of the threaded sleeve, wherein this is in particular 2.1 to 5 times, in particular 2.2 to 3 times as thick as the wall thickness of the threaded sleeve.

Preferably, the bottom side of the head is adapted to the contour of the outer side of the shell of the ballistic protective helmet. In particular, the bottom side of the head is complementary in shape with the contour of the outer side of the shell.

In one embodiment, the head of the screwing means is designed flat.

According to another embodiment, the ballistic protective helmet is developed in that the threaded sleeve comprises a shoulder. The shoulder of the threaded sleeve is in particular a flange-like collar that expands the diameter of the threaded sleeve in a radial direction at one of its two head ends. The shoulder is for example designed continuous and with an unchanging peripheral width; however, it can also be designed interrupted or with a varying width.

In the region of the shoulder, the threaded sleeve has a diameter that at least approximately corresponds to a head width of the screwing means that can be screwed into the threaded sleeve. It can also be provided that the shoulder has a diameter which is greater or smaller than the head width of the screwing means. In any case, the shoulder extends beyond a diameter of the outer thread of the threaded sleeve. It is in particular provided that the diameter of the shoulder is two to four times, in particular three times as large as an outer diameter of the bolt thread of the threaded sleeve.

Preferably, the threaded sleeve serves to attach components, in particular accessory parts, to the protective helmet, namely from the outside, i.e., to the outer side.

Furthermore it is in particular provided that the threaded sleeve serves for attaching at least one first and/or at least one second component. The at least one first component is accommodated between the shell of the protective helmet and the shoulder of the threaded sleeve. The at least one second component is accommodated at the threaded sleeve by means of the screwing means.

The first and the second components are accommodated in two different planes, a first and a second plane. The possibility accordingly exists of accommodating first components that for example permanently remain on the helmet shell in the first plane, whereas second components that can be flexibly exchanged are accommodated in the second plane. This is possible with the assistance of the screwing means that can be screwed into the threaded sleeve. The first components are preferably damped between an outer side of the shell of the protective helmet and the shoulder of the threaded sleeve, and can furthermore have in particular through-holes through which the threaded sleeve extends. It is accordingly possible to accommodate the first components in both a force- and form-fit on the helmet shell.

The first and/or second components can be accessory parts such as a neck guard, a visual protection, an ear protection or a click rail for releasably attaching additional components or additional accessory parts or the like. In order to fasten a plurality of accessory parts or enable secure fastening in the click rail, preferably a plurality of threaded sleeves is introduced into a plurality of blind holes, wherein preferably at least some of the blind holes are introduced symmetrical to each other into the shell.

The material from which the shell of the ballistic protective helmet is produced is preferably a textile fabric or textile layers that together form a layered structure, as already mentioned. The textile layers themselves are preferably produced from high-strength technical fabrics such as aramide. The textile layers, or respectively the textile fabric, can be connected to a laminate material, i.e., a matrix material. Particularly those materials that are mentioned in EP 1 750 921 B1 are appropriate. Moreover, the shell of the ballistic protective helmet can be produced according to the method described therein. The connecting means, or respectively the matrix can be a resin, plastic or adhesive. For example, epoxide resin and polyester resin are suitable for this. Other resins can also be used.

Further features of the invention will become apparent from the description of embodiments according to the invention together with the claims and the accompanying drawings. Embodiments according to the invention can fulfill individual features or a combination of several features.

In the scope of the invention, features which are designated by "in particular" or "preferably" are understood to be optional features.

The invention is described below, without restricting the general idea of the invention, based on exemplary embodiments in reference to the drawings, whereby we expressly refer to the drawings with regard to the disclosure of all details according to the invention that are not explained in greater detail in the text. In the following.

In the drawings, the same or similar elements and/or parts are always provided with the same reference numbers; a reintroduction will therefore always be omitted.

Figure 1:
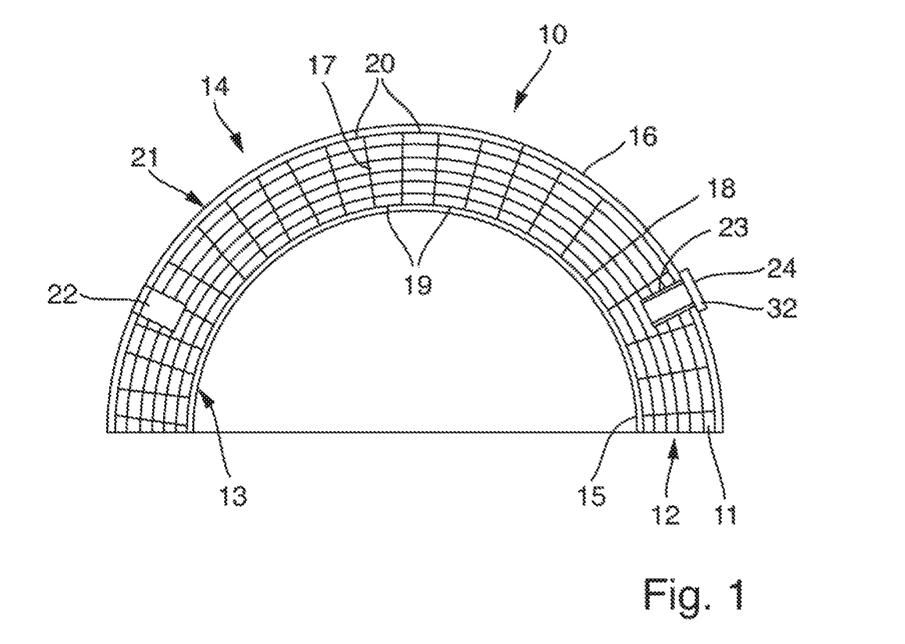
FIG. 1 shows a schematic sectional view of a ballistic protective helmet.

FIG. 1 schematically portrays a sectional view of a ballistic protective helmet 10. The shell 21 of the ballistic protective helmet 10 is produced from a number of textile layers 11 connected in a connection matrix. A resin such as a polyester resin or an epoxide resin can serve as the connection matrix. The textile layers can also be glued to each other. To prevent delamination from other layers upon being shot with a projectile, the textile layers 11 that are arranged in the layered structure 12 are sewn with seams 17, 18. The seams 17, 18 substantially run radially from the inside to the outside or from the outside to the inside to connect the layers with each other in a radial direction. The seams 17, 18 can also be meandering, wherein part of the meandering shape represents a seam 17, 18 portrayed in the radial direction.

Sections 19, 20 are formed by the seams 17, 18 and are separated from each other by the seams 17, 18. The outside 14 and the inside 13 of the ballistic protective helmet 10 can each be provided with a protective layer 15, 16. This protective layer 15, 16 can be a textile layer 11 that is glued on or laminated after sewing the ballistic protective helmet 10 and correspondingly pressing the ballistic protective helmet 10 as this is described in EP 1 750 921 B1.

Two blind holes 22 are introduced into the shell 21 in this exemplary embodiment, wherein one blind hole 22 on the left side is not yet provided with a threaded sleeve 23 in the view in FIG. 1, and the other blind hole 22 on the right side is provided with a threaded sleeve 23. A screwing means 24 comprising a head 32 is introduced into the threaded sleeve 23. The length of the threaded sleeve 23 is adapted to the depth of the blind hole 22, in particular is substantially the same size, so that the threaded sleeve 23 is flush with the outside 14 of the ballistic protective helmet 10. The screwing means 24 is adapted in terms of length 37 to the length of the interior of the threaded sleeve 23 in order to enable a secure connection, i.e., a connection that does not independently come loose if at all possible.

In the event that no other component, or respectively no accessory part is to be attached at a corresponding site of a blind hole 22 of the ballistic protective helmet 10, it is sufficient for the use of the ballistic protective helmet when the screwing means 24 is completely screwed into the threaded sleeve 23. In the event that an accessory part such as a click rail is to be attached, corresponding bolts can be used that are somewhat longer in order to take into account the thickness of the accessory part at the site at which the bolt penetrates this accessory part. A click rail can for example serve to easily fasten other components in a releasably connectable manner such as an ear protection, a visual protection such as a ballistic visor, or the like.

Figure 2:
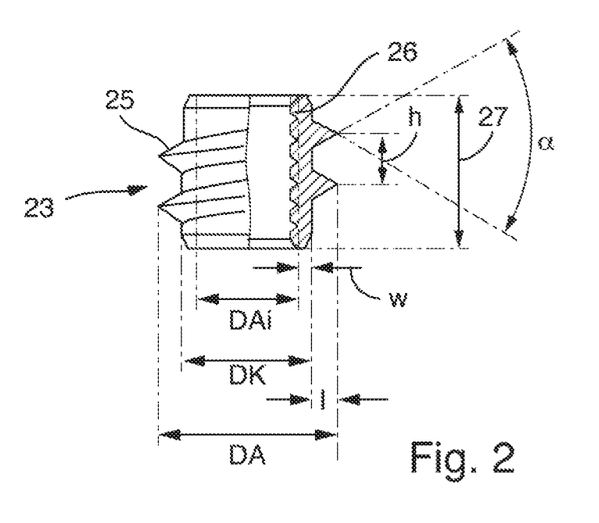
FIG. 2 shows a schematic partially sectional view of a threaded sleeve.
Figure 3:
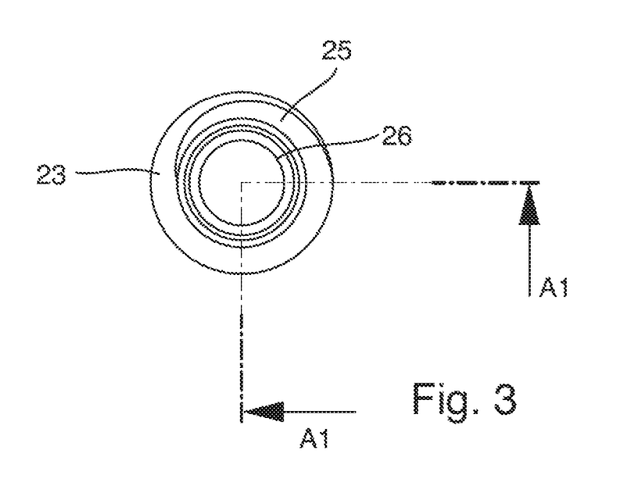
FIG. 3 shows a schematic plan view of the threaded sleeve from FIG. 2.

FIG. 2 schematically shows a partial sectional view of a threaded sleeve 23. The cut is made along line A1-A1 from FIG. 3. FIG. 3 shows a plan view of the threaded sleeve 23 from FIG. 2.

The threaded sleeve 23 has an outer thread 25 that serves to be screwed into the blind hole 22. The outer thread 25 has a thread pitch h that for example is $1/7$ to $3/7$, preferably $2/7$, of the outer diameter $D_A$ of the threaded sleeve 23. Moreover, the outer thread 25 has a flank angle α between 30° and 70°, preferably between 55° and 65°. The length 27 of the outer thread 25 is adapted to the depth of the blind hole 22. In particular, the length 27 is somewhat more than one-half of the thickness of the shell 21 of the ballistic protective helmet 10. The profile depth I of the outer thread 25, i.e., the thread depth I, is $3/28$ to $2/7$, in particular $1/7$ of the outer diameter $D_A$ of the threaded sleeve 23.

The wall thickness W, i.e., the core diameter $D_K$ of the outer thread 25 minus the outer diameter $D_{AI}$ of the inner thread 26 is preferably 1.0 mm in this exemplary embodiment.

Figure 4:
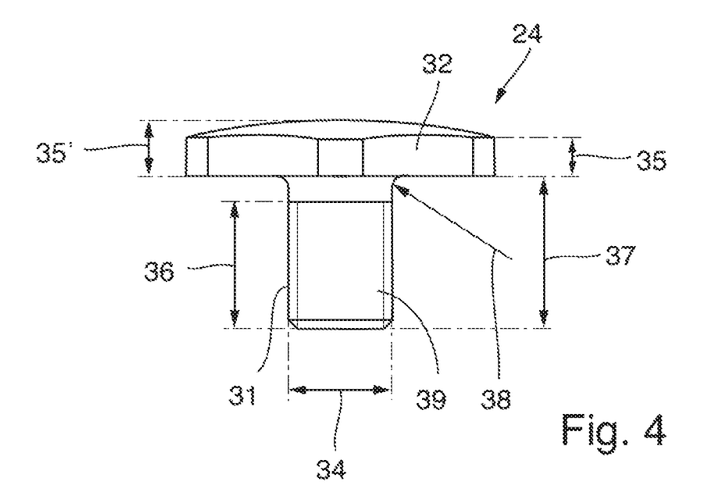
FIG. 4 shows a schematic view of a screwing means.
Figure 5:
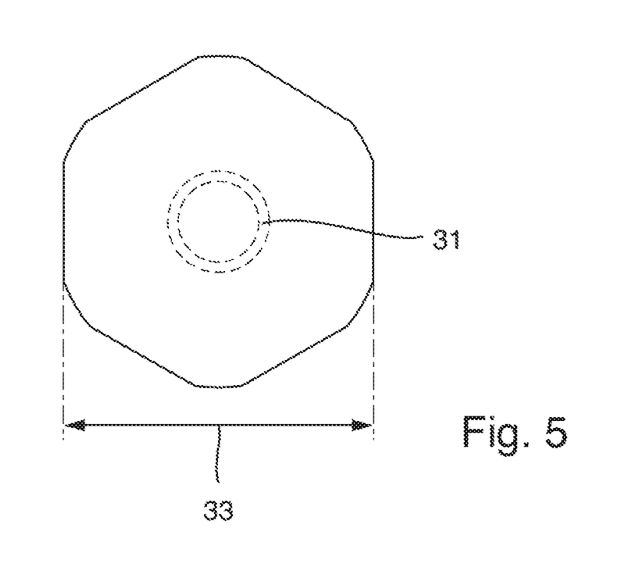
FIG. 5 shows a plan view of the screwing means from FIG. 4 in a schematic form.

The screwing means 24 has a bolt thread 39 that is adapted in terms of length 37 to the length of the inner thread 26 of the threaded sleeve 23. The outer diameter 34 of the thread of the screwing means 24 lies within the range of the outer diameter $D_{AI}$ of the inner thread 26 of the threaded sleeve 23. The bolt thread 39 can be rounded at the transition to the head 32 of the screwing means 24. A chamfer can also be provided here. The rounding, or respectively chamfer can be complementary in shape to a chamfer or rounding of the threaded sleeve 23 in the top region i.e., at the opening of the threaded sleeve 23 for screwing into the inner thread 26. This produces a good lock.

A relatively large head 32 of the screwing means 24 is provided to establish high ballistic suitability. The head 32 has a head width 33 that is at least twice as large as the outer diameter 34 of the outer thread 31 of the bolt thread 39 of the screwing means 24. Moreover the head 32 is sufficiently thick at the thinnest site, i.e., with a head thickness 35 that supports the ballistic properties of the protective helmet 10. In the middle of the head 32, the head thickness 35' is somewhat larger than at the edge.

Figure 6:
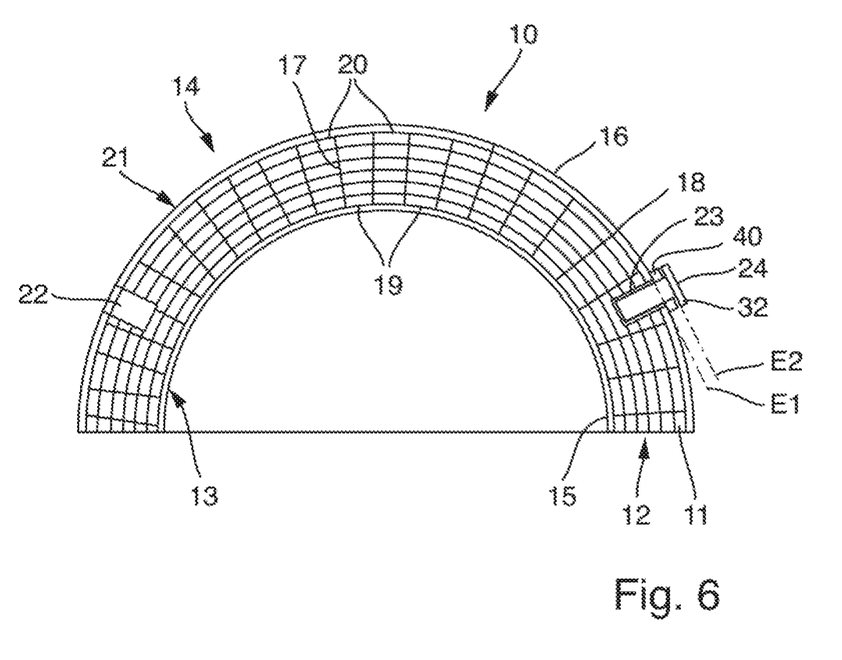
FIG. 6 shows a schematic sectional view of another ballistic protective helmet.

FIG. 6 shows a schematic sectional view of another ballistic protective helmet 10. The structure of the shell 21 of the ballistic protective helmet 10 has already been explained in association with FIG. 1. For example, two blind holes 22 are introduced into the shell 21, wherein the blind hole 22 on the left side is not yet provided with a threaded sleeve 23 in the view in FIG. 6, and the opposing blind hole 22 on the right side is provided with a threaded sleeve 23 that comprises a shoulder 40. A screwing means 24 comprising a head 32 is introduced into the threaded sleeve 23.

Due to its design comprising a shoulder 40, the threaded sleeve 23 offers the possibility of accommodating first components in a first plane E1 (shown in a dashed line) as well as in a second plane E2 (shown in a dot-dashed line). The first components accommodated in the first plane E1 are accommodated between the shoulder 40 of the threaded sleeve 23 and an outer side of the shell 21 of the protective helmet 10. These first components are preferably those that remain permanently on the protective helmet 10, for example a neck guard, or the like. Such a first component is for example provided with holes through which the threaded sleeve 23 is guided. When screwing in the threaded sleeve 23 into the shell 21 of the protective helmet 10, a damped connection can also be realized between this first component and the outside of the shell 21 of the protective helmet 10. Second components can be accommodated in the second plane E2 with the assistance of the screwing means 24. Since the screwing means 24 enables a flexible installation of these second components, it is recommendable to provide such components as second components that are exchanged from time to time. In the event that no other component, or respectively no accessory part is to be attached at a corresponding site of a blind hole 22 of the ballistic protective helmet 10, it is sufficient for the use of the ballistic protective helmet when the screwing means 24 is completely screwed into the threaded sleeve 23.

Figure 7:
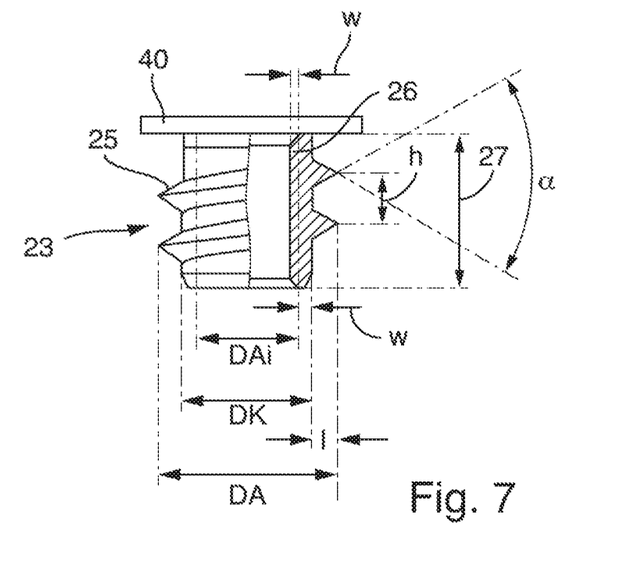
FIG. 7 shows a schematic partially sectional view of another threaded sleeve.

FIG. 7 schematically shows a partial sectional view of the threaded sleeve 23 provided with a shoulder 40. The shoulder 40 is designed as a flange-like collar; it extends beyond an outer diameter $D_A$ of the threaded sleeve 23 in a radial direction that lies transverse, in particular perpendicular to a direction of the longitudinal extension (that corresponds to the screwing-in direction of the threaded sleeve 23) of the threaded sleeve 23. The shoulder is preferably designed integrally with the threaded sleeve 23.

Figure 8:
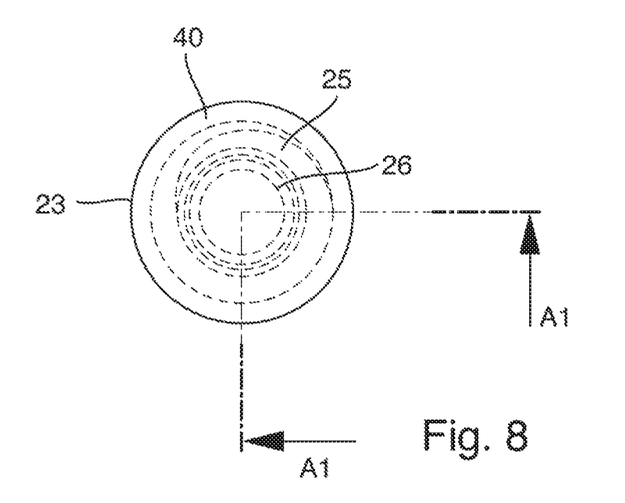
FIG. 8 shows a schematic plan view of the threaded sleeve from FIG. 7.

FIG. 8 shows a plan view of the threaded sleeve 23 shown in FIG. 7. Since the shoulder 40 projects beyond the outer thread 25, it is invisible in the plan view of the top side of the threaded sleeve 23 and is therefore portrayed in a broken line. In the middle, the shoulder 40 leaves the passage open in the direction of the inner thread 26 of the threaded sleeve 23. With regard to the use of the screwing means 24, the threaded sleeve 23 that comprises the shoulder 40 therefore has the same functionality as the threaded sleeve 23 described above in conjunction with FIG. 1 to 3.

All named features, including those taken from the drawings alone as well as individual features that are disclosed in combination with other features, are considered, alone and in combination, to be essential for the invention. Embodiments according to the invention can be fulfilled by individual features or a combination of several features.

LIST OF REFERENCE SIGNS

- 10 Protective helmet
- 11 Textile layer
- 12 Layered structure
- 13 Inside
- 14 Outside
- 15 Protective layer
- 16 Protective layer
- 17 Seam
- 18 Seam
- 19 Section
- 20 Section
- 21 Shell
- 22 Blind hole
- 23 Threaded sleeve
- 24 Screwing means
- 25 Outer thread
- 26 Inner thread
- 27 Length
- 31 Outer thread
- 32 Head
- 33 Head width
- 34 Outer diameter
- 35, 35' Head thickness
- 36 Thread length
- 37 Length
- 38 Curvature
- 39 Bolt thread
- 40 Shoulder
- E1 First plane
- E2 Second plane
- h Thread pitch
- I Thread depth
- α Flank angle
- $D_A$ Outer diameter
- $D_K$ Core diameter
- D Outer diameter of the inner thread
- W Wall thickness

The invention claimed is:

1. A ballistic protective helmet comprising:
   a shell; and
   a threaded sleeve;
   wherein the shell comprises a laminate shell material that includes multiple textile fabric layers connected in a connection matrix,
   wherein a blind hole is provided in the shell,
   wherein the blind hole extends through a plurality of the multiple textile fabric layers of the laminate shell material, but does not extend through all of the multiple textile fabric layers of the laminate shell material,
   wherein the plurality of the multiple textile fabric layers of the laminate shell material through which the blind hole extends peripherally surround the blind hole,
   wherein the threaded sleeve is received in the blind hole,
   wherein the threaded sleeve has an outer thread that penetrates into the plurality of the textile fabric layers of the laminate shell material that peripherally surround the blind hole, and
   wherein the threaded sleeve has an inner thread.

2. The ballistic protective helmet according to claim 1, wherein the threaded sleeve is glued in the blind hole.

3. The ballistic protective helmet according to claim 1, wherein the blind hole has a depth of 4 mm to 10 mm.

4. The ballistic protective helmet according to claim 3, wherein the length of the threaded sleeve is the same depth as the blind hole.

5. The ballistic protective helmet according to claim 1, wherein the outer thread of the threaded sleeve has a thread pitch (h) of $1/7$ to $3/7$ relative to an outer diameter (DA) of the threaded sleeve.

6. The ballistic protective helmet according to claim 1, wherein the outer thread has a thread depth (I) of $3/28$ to $2/7$ relative to an outer diameter (DA) of the threaded sleeve.

7. The ballistic protective helmet according to claim 1, wherein the threaded sleeve has a wall thickness (W) of 0.5 mm to 3.0 mm.

8. The ballistic protective helmet according to claim 1, wherein the threaded sleeve has a warning color, at least on a part that is visible in a state in which the threaded sleeve is introduced into the blind hole.

9. The ballistic protective helmet according to claim 1 further comprising a screwing means having an outer thread, wherein the screwing means having the outer thread is screwed into the inner thread of the threaded sleeve.

10. The ballistic protective helmet according to claim 9, wherein the screwing means has a head that has a head width which is two to four times as large as an outer diameter of the outer thread of the screwing means.

11. The ballistic protective helmet according to claim 10, wherein the head of the screwing means has a thickness at a thinnest point that is greater than a wall thickness (W) of the threaded sleeve.

12. The ballistic protective helmet according to claim 1, wherein the threaded sleeve comprises a shoulder.

13. The ballistic protective helmet according to claim 1, wherein a plurality of blind holes are provided in the shell, wherein the plurality of blind holes do not extend through all of the plurality of textile layers of the laminate shell material, wherein textile layers through which the plurality of blind holes extend peripherally surround the plurality of blind holes, wherein a plurality of threaded sleeves are each separately received in a respective one of the plurality of blind holes, and wherein each of the plurality of threaded sleeves has an outer thread that penetrates into the textile layers of the laminate shell material that peripherally surround the respective one of the plurality of blind holes in which said threaded sleeve is received.

14. The ballistic protective helmet according to claim 13, wherein at least a fraction of the plurality of blind holes are introduced symmetrical to each other into the shell.

15. The ballistic protective helmet according to claim 1, wherein in a cross sectional view, an outer surface of the shell forms an arc, and wherein each of the plurality of textile layers extend along the arc.

* * * * *